Patented Feb. 27, 1940

2,191,564

UNITED STATES PATENT OFFICE 2,191,564

HYDROXYTHIOETHERS AND PROCESS OF PRODUCING SAME

Charles Graenacher, Riehen, and Richard Sallmann, Bottmingen, Switzerland, assignors to the firm Society of Chemical Industry in Basle, Basel, Switzerland No Drawing. Application July 12, 1938, Serial No. 218,878. In Switzerland July 14, 1937

5 Claims. (Cl. 260—609)

This invention relates to the manufacture of hydroxythioethers by causing a mercaptan which has at least one hydroxy-group in free form or in the form of a derivative, to react with an organic compound which contains more than two carbon atoms and at least one double linking between two carbon atoms capable of forming addition products, and is free from halogen and sulfur atoms. The compounds which contain besides the SH-group an OH-group have a surprising degree of reactivity so that the manufacture proceeds under mild conditions, which is of importance in respect of economy of the parent material and in respect of necessary apparatus. The compounds having double linkings which come into question include unsaturated compounds of the aliphatic, cyclo-aliphatic, aromatic or heterocyclic series, the unsaturated character of which is due to the presence of at least one —C=C-union. Such compounds are, for example, the alkylenes, the di- and polyalkylenes, for instance propylene, octylene, octadecylene, butadiene, isoprene, diisobutylene, triisobutylene, tetraisobutylene, polyisoamylene, polyisohexylene, the technical olefines of the cracking process, dipentene, camphene, pinene, styrene, stilbene, dihydronaphthalene or the like; also substitution products of such hydrocarbons, for instance allyl alcohol, olein alcohol, oleic acid amide, linoleic acid amide, terpineol; heterocyclic compounds, for instance vinyl pyridine and allyl pyridine, cinchonine, quinine or the like. Commercial mixtures containing olefines may be used without separating the olefines. Such mixtures are produced by the thermal decomposition of mineral oil, products from mineral oil, brown coal tar oils and similar materials, also by the destructive distillation of coal, pitch, tar, asphalt and similar carbonaceous materials. Such mixtures containing olefines may be decomposed into several fractions which in the main contain compounds with the same number of carbon atoms. The use of individual or approximately individual unsaturated compounds may facilitate the supervision of the reaction and improve the yield of pure products.

Compounds which contain both sulfhydril and hydroxyl groups are, for example, hydroxyethylmercaptan, $\alpha$:$\beta$-dihydroxypropylmercaptan, hydroxythiophenol, hydroxybenzylmercaptans, mercapto-sugar or the like.

In many cases the reaction occurs when the components are merely mixed at the ordinary temperature with or without the addition of a small proportion of a substance that promotes the reaction (catalyst), especially a substance of acid or alkaline reaction, for instance sulfuric acid, acetic acid, acetic anhydride, hydrochloric acid or hydrobromic acid, caustic alkali, alkali alcoholate, ammonia, an organic base, for instance piperidine.

Frequently it is advantageous to exclude water as far as possible. To this end the components that are to react may be previously carefully dried. However, the reaction may also be carried out in the presence of substances which bind water.

Since the exothermic nature of the reaction is occasionally considerable, it may be of advantage to cool suitably the reaction vessel.

One or both of the components may be dissolved in a suitable solvent, and then mixed for reaction as a whole or in portions.

Sometimes it is necessary to heat the mixture of the components or the mixture of their solutions for a long time in order to produce the reaction or to complete it quantitatively.

The hydroxymercaptan may be added to the unsaturated compound at a temperature which is generally between 10 and 120° C. It may be necessary, however, to select a temperature lower or higher than this for the reaction.

The products obtained by the invention are valuable intermediate products for making textile assistants, dyestuffs, medicaments or the like. If the hydroxythioethers are sufficiently soluble in water and are made from suitable parent materials, they are useful as textile assistants. By means of sulfonating agents the hydroxythioethers can be converted into acid sulfuric acid esters which, depending upon their constitution, are more or less stable; their alkali salts are capillary active substances having pronounced capacity as wetting agents, washing agents or emulsifying agents.

The products obtainable according to the present process have the formula R—S—R$_1$ wherein R stands for an organic radical containing more than 2 carbon atoms, for instance a terpene radical, and R$_1$ stands for an alkyl radical containing at least one hydroxy-group. When starting from unsaturated aliphatic hydrocarbons obtained by cracking, wherein, as is known, the ethylene linkage does not exist at the end of the chain formed by carbon atoms, there are obtained products of the formula

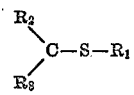

wherein R$_2$ and R$_3$ are alkyls and

is the radical of the cracked aliphatic hydrocarbon. Thus, for example from an olefine obtained by cracking and containing hydrocarbons with 10 to 12 carbon atoms in the molecule there can be produced, by means of hydroxyethylmercaptan, a hydroxyethylthioether of the formula

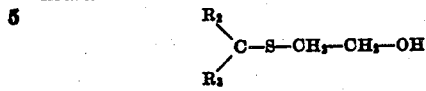

wherein

is the radical of an aliphatic hydrocarbon containing 10 to 12 carbon atoms in the molecule.

The following examples illustrate the invention, the parts being by weight, and the ratio of parts by volume to parts by weight being that which exists between the liter and the kilo:

Example 1

22.5 parts of commercial octylene (boiling point 115–125° C., at 720 mms., iodine No. 214), 15.5 parts of hydroxyethylmercaptan and 0.2 part of glacial acetic acid are mixed while stirring. The two liquids are not of themselves miscible. After a short time, however, heat is evolved and the mixture becomes a clear solution. After standing for some time in hot condition, the mass is distilled. After a first running in four parts, the bulk distils at 146–151° C. (12 mms.) and has the iodine No. 20.8.

The new product is a colorless thin oil freely soluble in the usual organic solvents.

Example 2

13.7 parts of a commercial olefine (boiling point 50–100° C. under 12 mms. pressure, iodine No. 182, containing 10–12 carbon atoms in the molecule) obtained by the cracking process are mixed with 7.7 parts of hydroxyethylmercaptan and 0.5 part of acetic acid. The mixture is heated for 20 hours at 80–90° C. After distilling a small quantity of an unchanged mixture of olefines and hydroxyethylmercaptan, there remains a brownish oil which boils under 12 mms. pressure between 150 and 172° C.

Example 3

38 parts of terpineol are mixed with 20 parts of hydroxyethylmercaptan. After a short time heat is developed and care must be taken that the temperature does not rise above 70–80° C. When there is no further rise of temperature, the mass is heated for 2 hours at 60–70° C., whereafter the oil produced is distilled in a vacuum. It boils at 175–178° C. under 4 mms. pressure and is a viscid oil insoluble in water but very easily emulsified and is freely soluble in the usual organic solvents.

Example 4

21 parts of cyclohexene and 20 parts of hydroxyethylmercaptan are mixed together; after a short time the clear solution becomes hot. By external cooling care is taken that the temperature of the mixture does not rise essentially above 60° C. When no more heat is developed, the mixture is heated for some hours at 60° C. to complete the reaction, whereupon the mixture is fractionally distilled. After a first running amounting to about 4 parts, the main portion of the new compound boils at 115–125° C. (5 mms.). It is a yellowish oil freely soluble in the usual organic solvents.

Example 5

35 parts of allyl alcohol and 40 parts of hydroxyethylmercaptan are mixed at room temperature; after standing for some time reaction sets in gradually with development of heat. If 0.5 part of acetic acid is added to the mixture, the reaction begins after a few minutes and care must be taken by external cooling to avoid boiling of the mass. When no more heat is developed, the mixture is heated for an hour on the water bath and then fractionally distilled. After a small first running the new compound distils directly as an individual at 164–166° C. (12 mms.). The hydroxypropylhydroxyethylthioether thus obtained in good yield is an approximately colorless oil freely soluble in water and having a high capacity for dissolving dyestuffs.

Example 6

9.3 parts of a mixture of unsaturated aliphatic hydrocarbons (boiling point 50–100° C. under 12 mms. pressure, iodine No. 182) are stirred with 9 parts of acetone-thioglycerine. After addition of 10 drops of piperidine, the mixture is allowed to stand for some days at ordinary temperature and then distilled in a vacuum. After the residues of the two components have distilled, a condensation product distils at 143–151° C. (0.2 mms.). By raising the temperature the time occupied in the reaction may be appreciably shortened. The new compound is soluble in organic solvents, but completely insoluble in water. By boiling the alcoholic solution for a prolonged time after addition of so much dilute sulfuric acid that the solution is strongly acid, acetone is eliminated and there is obtained a corresponding dihydroxythioether in the form of an oil. This is soluble in cold water in great dilution with foaming.

Example 7

22 parts of thioglycerine and 31 parts of a mixture of unsaturated aliphatic hydrocarbons containing 10–12 carbon atoms per molecule (boiling point 50–100° C. under 12 mms. pressure, iodine No. 182) and 80 parts by volume of glacial acetic acid are heated together at 55–60° C. for some days. There is produced a condensation product which is in large part acetylated. By removing the glacial acetic acid and boiling the residue with alcoholic sodium hydroxide solution there is produced a product which agrees in its properties with that of Example 6.

What we claim is:

1. A process for the production of hydroxythioethers, which comprises reacting a mercaptan containing at least one hydroxy-group with a compound of the terpene series which contains at least one ethylene linkage capable of forming addition products and which is free from halogen and sulfur atoms.

2. A process for the production of hydroxythioethers, which comprises reacting an aliphatic mercaptan containing at least one hydroxy-group with a compound of the terpene series which contains at least one ethylene linkage capable of forming addition products and which is free from halogen and sulfur atoms.

3. A process for the production of hydroxythioethers, which comprises reacting an aliphatic mercaptan containing at least one hydroxy-group with terpineol.

4. The hydroxythioether of the general formula $$R-S-R_1$$

wherein R stands for a terpenic radical and $R_1$ stands for an alkyl radical containing at least one hydroxy-group which products are oily to solid masses soluble in organic solvents.

5. The hydroxyethylthioether of the formula $$R-S-CH_2-CH_2-OH$$

wherein R stands for the radical of dihydroterpineol, which product is a viscid oil boiling at 175–178° C. under 4 mms. pressure.

CHARLES GRAENACHER.
RICHARD SALLMANN.